(12) United States Patent
Zhang et al.

(10) Patent No.: US 12,715,073 B2
(45) Date of Patent: Aug. 25, 2026

(54) WORKPIECE PLATING TREATMENT METHOD AND WORKPIECE MANUFACTURING METHOD

(71) Applicants: Tyco Electronics (Suzhou) Ltd., Suzhou (CN); Tyco Electronics (Shanghai) Co., Ltd., Shanghai (CN)

(72) Inventors: Daiqiong (Diana) Zhang, Shanghai (CN); Dongqing (Gates) Peng, Suzhou (CN); Chunyan (Cherie) Zhou, Shanghai (CN); Weidong Zhang, Shanghai (CN); Jingjing (Justin) Gu, Suzhou (CN); Zhongxi Huang, Shanghai (CN); Jingshu Gong, Shanghai (CN)

(73) Assignees: Tyco Electronics (Suzhou) Ltd., Suzhou City (CN); Tyco Electronics (Shanghai) Co., Ltd., Shanghai (CN)

( * ) Notice: Subject to any disclaimer, the term of this patent is extended or adjusted under 35 U.S.C. 154(b) by 736 days.

(21) Appl. No.: 18/322,776

(22) Filed: May 24, 2023

(65) Prior Publication Data

US 2023/0381893 A1 Nov. 30, 2023

(30) Foreign Application Priority Data

May 24, 2022 (CN) ......................... 202210570720.6

(51) Int. Cl.
*B23K 26/352* (2014.01)
*B23K 26/00* (2014.01)
(Continued)

(52) U.S. Cl.
CPC ...... *B23K 26/3576* (2018.08); *B23K 26/0006* (2013.01); *B23K 26/0622* (2015.10); *B23K 26/354* (2015.10)

(58) Field of Classification Search
CPC .............. B23K 26/082; B23K 26/3576; B23K 26/0622; B23K 26/354; B23K 26/0006; B23K 2101/34; B23K 2101/40; B23K 2101/42; C25D 5/505; B22F 10/25; B22F 10/28
See application file for complete search history.

(56) References Cited

U.S. PATENT DOCUMENTS

RE37,537 E * 2/2002 Stinnett .................. H01J 27/14 427/523
6,835,657 B2 * 12/2004 Ong .................... H10W 20/062 438/626
(Continued)

FOREIGN PATENT DOCUMENTS

CN 117564468 B * 7/2024 ........... B23K 26/702

*Primary Examiner* — Nathaniel E Wiehe
*Assistant Examiner* — Jackson N Gillenwaters
(74) *Attorney, Agent, or Firm* — Barley Snyder

(57) ABSTRACT

A workpiece plating treatment method includes the steps of providing a pulse laser having a plurality of different energy levels, adjusting the pulse laser to the plurality of different energy levels, and scanning a plating layer of a workpiece with the pulse laser at the plurality of different energy levels to effect different changes on the plating layer. The different energy levels include an activation energy level, a temperature rise energy level, a constant temperature energy level, a melting energy level, a cooling energy level, and a polishing energy level.

20 Claims, 6 Drawing Sheets

(51) Int. Cl.
*B23K 26/0622* (2014.01)
*B23K 26/354* (2014.01)

(56) References Cited

U.S. PATENT DOCUMENTS

| | | | | |
|---|---|---|---|---|
| 11,276,665 | B2 * | 3/2022 | Kim | B23K 1/0056 |
| 2014/0110266 | A1 * | 4/2014 | Levey | C25D 3/30<br>205/219 |
| 2022/0042145 | A1 * | 2/2022 | Oestlund | C22C 29/005 |

* cited by examiner

| Parameter | Unit | Activation | Temp. rise | Constant | Melting | Cooling I | Cooling II | Polishing |
|---|---|---|---|---|---|---|---|---|
| wavelength | nm | 1064 | 1064 | 1064 | 1064 | 1064 | 1064 | 1064 |
| Spot diameter | um | 50 | 50 | 50 | 50 | 50 | 50 | 50 |
| Spot distance | um | 5 | 5 | 5 | 5 | 5 | 5 | 5 |
| scanning speed | mm/s | 10000 | 8000 | 6000 | 5000 | 8000 | 8000 | 10000 |
| Pulse frequency | kHz | 500 | 2000 | 2000 | 2000 | 2000 | 1600 | 800 |
| pulse power | W | 17.5 | 15 | 15 | 25 | 12.5 | 17.5 | 17.5 |
| pulse width | ns | 200 | 300 | 666 | 666 | 600 | 600 | 100 |
| Light out delay | us | 70 | 100 | 100 | 100 | 100 | 100 | 100 |
| Off light delay | us | 5 | 300 | 300 | 300 | 300 | 300 | 5 |
| End Delay | us | 5 | 200 | 200 | 200 | 200 | 200 | 5 |
| Corner delay | us | 0 | 5 | 5 | 5 | 5 | 5 | 0 |
| Scan time | ms | 210 | 263 | 350 | 420 | 263 | 263 | 210 |
| Accu. energy | mJ | 42 | 210 | 280 | 336 | 210 | 168 | 67 |
| Energy density | $mJ/mm^2$ | 2.1 | 10.5 | 14.0 | 16.8 | 10.5 | 8.4 | 3.4 |

Fig.4

WORKPIECE PLATING TREATMENT METHOD AND WORKPIECE MANUFACTURING METHOD

CROSS-REFERENCE TO RELATED APPLICATION

This application claims the benefit of the filing date under 35 U.S.C. § 119(a)-(d) of Chinese Patent Application No. 202210570720.6, filed on May 24, 2022.

FIELD OF THE INVENTION

The present invention relates to a workpiece plating treatment method and a workpiece manufacturing method.

BACKGROUND

Although the electrical conductivity of low melting point metal plating such as tin, indium, bismuth, and lead plating is not as good as that of precious metals such as gold and platinum, they also rank among the top of most metals, especially tin plating, which is widely used in the welding and crimping of electronic connectors and their mating ends, such as PCBs, due to its low melting point, good ductility, and low price. With the rapid development of press fit technology, as well as the increasing demand for connector connection robustness in mobile applications such as automotive applications, press fit applications are increasingly replacing complex welding. In order to maintain sufficient crimping retention force (pull-out force) to prevent the connection from loosening due to vibration and maintain a sufficiently low contact resistance, however, the insertion force of crimping is too large. One of the problems caused is difficulty in assembly and insertion, and excessive damage to the tin plating layer at both ends of the matching. The second problem is that insertion damage can exacerbate the growth of tin whiskers in the tin plating layer, resulting in overlapping short circuits between adjacent terminals or PCB lines.

In order to solve the above problems, reflow tin melting technology was applied. The tin plating layer is cooled and recrystallized after melting, and an intermetallic compound is formed between the freely molten tin and the base layer or intermediate plating layer. The hardness increases, the wear resistance decreases, the surface roughness decreases, and the friction coefficient decreases. Under the same pressing force, the insertion force decreases (insertion force=friction coefficient*positive pressure). At the same time, the internal stress of the tin plating layer is released after remelting, further reducing the risk of tin whiskers. Currently, reflow soldering of tin is commonly used to heat molten tin plating by using electric furnace resistance wires to heat hot air or by using infrared thermal radiation baking to melt tin plating. These options are time consuming, and the process is slow.

In the prior art, inductor and laser melt plating are rarely used. Inductive melting and laser melting, however, have the advantages of local precision selectivity, uniform and controllable energy distribution, small workspace occupation, short time consumption, and high speed and efficiency. However, a short process is also a disadvantage; it can cause the tin plating layer to rise from room temperature to the melting point in an instant (about 0.1 seconds) and then quickly return to room temperature, which can cause thermal shock due to sudden cooling and heating, leaving the plating layer at risk of cracking and splashing tin spots. However, no matter which energy method is selected for melting, it is impossible to avoid the problems of oxidation dirt before melting and high-temperature oxidation during the melting process.

SUMMARY

A workpiece plating treatment method includes the steps of providing a pulse laser having a plurality of different energy levels, adjusting the pulse laser to the plurality of different energy levels, and scanning a plating layer of a workpiece with the pulse laser at the plurality of different energy levels to effect different changes on the plating layer. The different energy levels include an activation energy level, a temperature rise energy level, a constant temperature energy level, a melting energy level, a cooling energy level, and a polishing energy level.

BRIEF DESCRIPTION OF THE DRAWINGS

Features of the present invention will become more apparent by describing in detail exemplary embodiments thereof with reference to the accompanying drawings, in which:

FIG. 4 is a table of the operating parameters of a pulse laser according to an exemplary embodiment of the present invention at various energy levels shown in FIG. 1;

DETAILED DESCRIPTION OF EXEMPLARY EMBODIMENTS

Figures 1A, 1B, 1C, 1D, 1E, 1F, 1G:
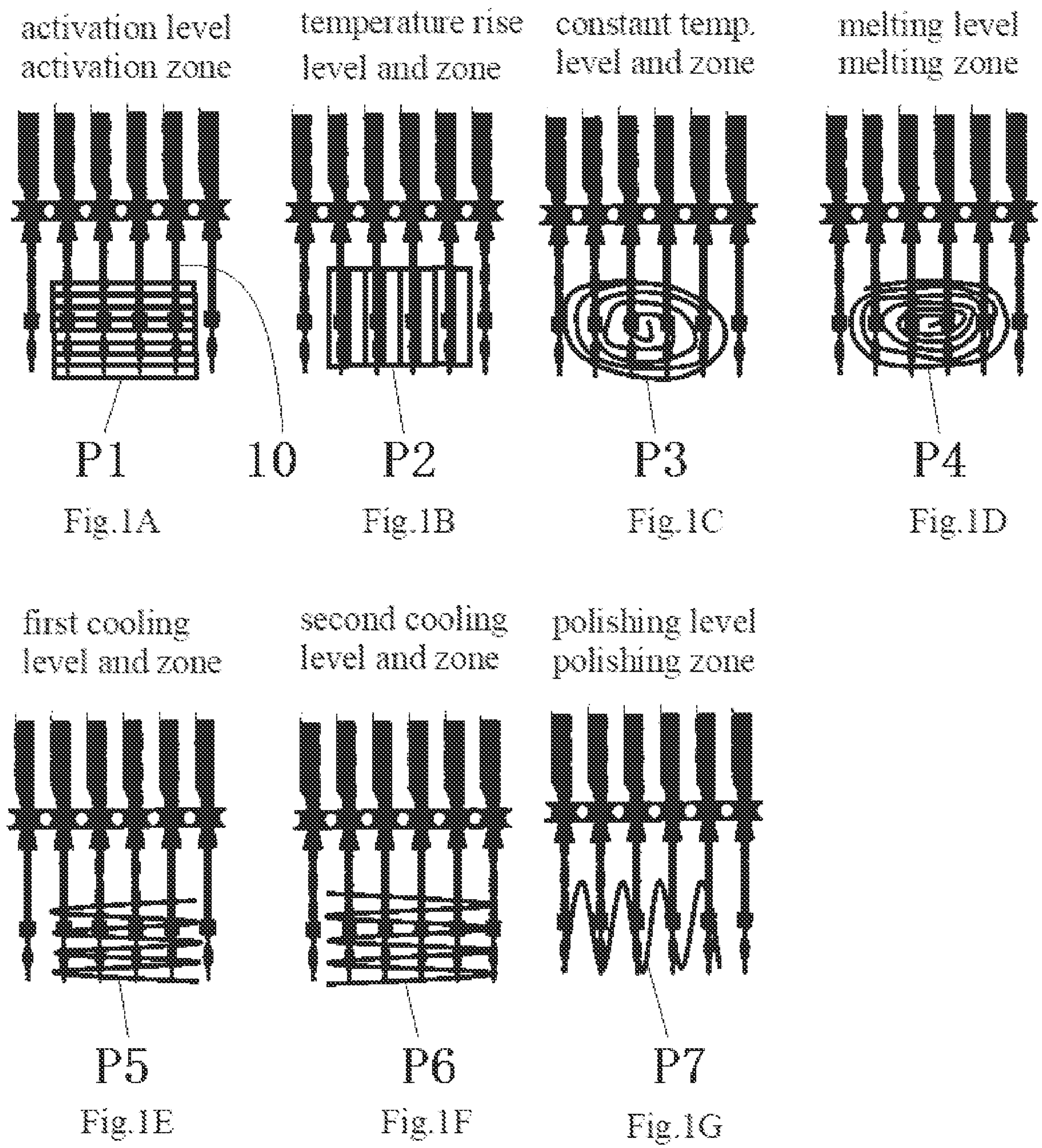
FIGS. 1A-1G show a process of processing a plating layer on a workpiece using a pulse laser according to an exemplary embodiment of the present invention.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
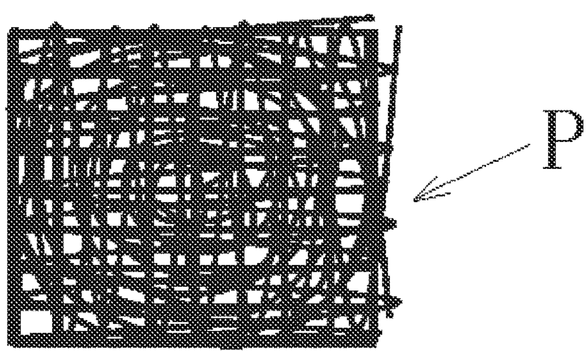
FIG. 2 is a schematic diagram of a composite scan trajectory synthesized from multiple different scan trajectories in FIG. 1.
Figure 3:
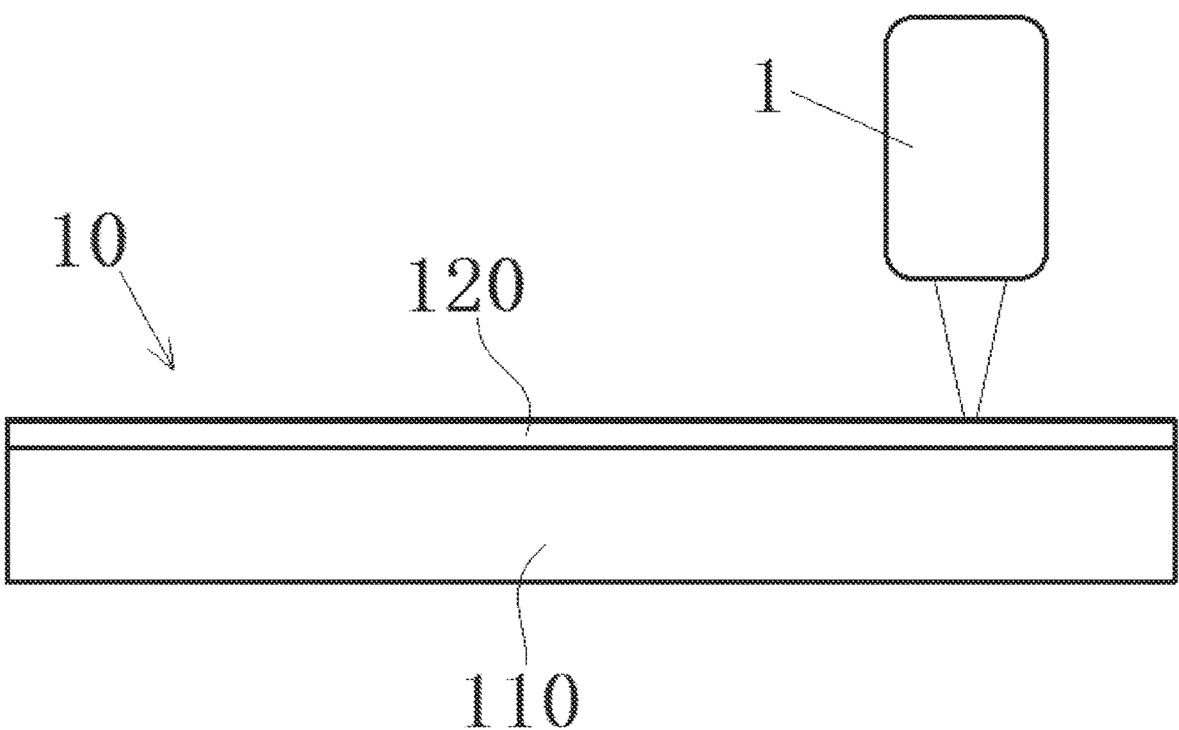
FIG. 3 is a schematic diagram of scanning a plating layer on a workpiece using a pulse laser.

FIGS. 1A-1G show the process of processing the plating layer 120 on the workpiece 10 using a pulse laser 1 according to an exemplary embodiment of the present invention. FIG. 2 shows a schematic diagram of a composite scanning trajectory P composed of multiple different scanning trajectories P1~P7 in FIG. 1. FIG. 3 shows a schematic diagram of scanning the plating layer 120 on the workpiece 10 using a pulse laser 1. FIG. 4 shows the operating parameters of a pulse laser 1 according to an exemplary embodiment of the present invention at various energy levels shown in FIG. 1.

The pulse laser 1 is adapted to emit laser light in a pulsed manner and process the plating layer 120 on the workpiece 10 using the emitted laser light. In an exemplary embodiment of the present invention, the workpiece 10 may be a terminal, circuit board, or other electronic product. The plating layer 120 may be a tin plating layer, an indium plating layer, a bismuth plating layer, or a lead plating layer.

The process of processing the plating layer 120 on the workpiece 10 will be described below with reference to the attached drawings, which mainly includes the following steps:

S10: Providing a pulse laser 1 with multiple different energy levels, and at least one of the scanning speed, pulse frequency, pulse power, and pulse width of the pulse laser 1 is different at different energy levels. As shown in FIGS. 1A-1G, the pulse laser 1 has seven different energy levels, namely, the activation energy level, the temperature rise energy level, the constant temperature energy level, the melting energy level, the cooling energy level (including the first and second cooling energy levels), and the polishing energy level. In the shown embodiment, different energy levels correspond to seven different temperature zones, which are respectively referred to as the activation zone, the temperature rise zone, the constant temperature zone, the melting zone, the cooling zone (including the first and second cooling zones), and the polishing zone.

S20: As shown in FIG. 1A, adjusting the pulse laser 1 to the activation energy level and scanning the plating layer 120 on the workpiece 10 removes oxides, dirt, and dust from the surface of the plating layer 120 and activates the surface of the plating layer 120. At the activation energy level, the laser emitted by the pulse laser 1 generates very little heat, which does not cause the temperature of the plating layer 120 to rise or rise significantly, leaving the temperature of the plating layer 120 in a temperature zone that is slightly higher than room temperature. This temperature zone is called the activation zone.

S30: As shown in FIG. 1B, adjusting the pulse laser 1 to the temperature rise energy level and scanning the plating layer 120 on the workpiece 10 heats the plating layer 120 to the temperature rise zone. In this step, the temperature of the plating layer 120 is raised to a temperature rise zone.

S40: As shown in FIG. 1C, adjusting the pulse laser 1 to a constant temperature energy level and scanning the plating layer 120 on the workpiece 10 heats the plating layer 120 to a constant temperature zone higher than the temperature rise zone. In this step, the plating layer 120 is maintained in a constant temperature zone.

S50: As shown in FIG. 1D, adjusting the pulse laser 1 to the melting energy level and scanning the plating layer 120 on the workpiece 10 heats the plating layer 120 to a melting zone higher than the constant temperature zone. In this step, the plating layer 120 is melted.

S60: As shown in FIGS. 1E and 1F, adjusting the pulse laser 1 to the cooling energy level and scanning the plating layer 120 on the workpiece 10 cools the plating layer 120 to a cooling zone lower than the melting zone. In this step, the molten plating layer 120 is cooled and solidified.

S70: As shown in FIG. 1G, adjusting the pulse laser 1 to the polishing energy level and scanning the plating layer 120 on the workpiece 10 removes oxides from the surface of the plating layer 120 and smooths the surface of the plating layer 120. In this step, oxides on the surface of the plating layer 120 are removed by laser light, resulting in a smooth surface of the plating layer 120. At the polishing energy level, the laser emitted by the pulse laser 1 generates very little heat, which does not cause the temperature of the plating layer 120 to rise or rise significantly, leaving the temperature of the plating layer 120 in a temperature zone that is slightly higher than room temperature. This temperature zone is called the polishing zone. Generally, the temperature of the polishing zone is lower than the temperature of the cooling zone.

As shown in the embodiments of FIGS. 1A-1G, seven different energy levels correspond to seven different temperature zones, respectively referred to as the activation zone, the temperature rise zone, the constant temperature zone, the melting zone, the cooling zone (including the first and second cooling zones), and the polishing zone.

In an embodiment, the step S60 includes:

S61: Adjusting the pulse laser 1 to the first cooling energy level and scanning the plating layer 120 on the workpiece 10 to cool the plating layer 120 to a first cooling zone lower than the melting zone; and

S62: Adjusting the pulse laser 1 to the second cooling energy level and scanning the plating layer 120 on the workpiece 10 to cool the plating layer 120 to a second cooling zone lower than the first cooling zone.

In another exemplary embodiment of the present invention, step S60 may also include:

S63: Adjusting the pulse laser 1 to the third cooling energy level and scanning the plating layer 120 on the workpiece 10 to cool the plating layer 120 to a third cooling zone lower than the second cooling zone.

As shown in FIG. 4, the cumulative energy of the laser emitted by the pulse laser 1 at the activation and polishing energy levels is smaller than the cumulative energy of the laser emitted by the pulse laser 1 at the heating, constant temperature, melting, and cooling energy levels. The energy density of the laser emitted by the pulse laser 1 at the activation energy level and the polishing energy level is lower than that of the laser emitted by the pulse laser 1 at the temperature rise energy level, the constant temperature energy level, the melting energy level, and the cooling energy level.

As shown in FIG. 4, in the illustrated embodiment, the cumulative energy of the laser emitted by the pulse laser 1 at the activation energy level is smaller than the cumulative energy of the laser emitted by the pulse laser 1 at the polishing energy level. The energy density of the laser emitted by the pulse laser 1 at the activation energy level is lower than that of the laser emitted by the pulse laser 1 at the polishing energy level.

As shown in FIG. 4, in the illustrated embodiment, the cumulative energy of the laser emitted by the pulse laser 1 at the cooling energy level is smaller than the cumulative energy of the laser emitted by the pulse laser 1 at the temperature rise energy level, the constant temperature energy level, and the melting energy level. The energy density of the laser emitted by the pulse laser 1 at the cooling energy level is lower than that of the laser emitted by the pulse laser 1 at the temperature rise energy level, the constant temperature energy level, and the melting energy level.

As shown in FIG. 4, in the illustrated embodiment, the scanning speed of pulse laser 1 at the activation and polishing energy levels is higher than that of pulse laser 1 at the heating, constant temperature, melting, and cooling energy levels.

As shown in FIG. 4, in the illustrated embodiment, the pulse frequency of the pulse laser 1 at the activation and polishing energy levels is lower than the pulse frequency of the pulse laser 1 at the heating, constant temperature, melting, and cooling energy levels.

As shown in FIG. 4, in the illustrated embodiment, the pulse power of the pulse laser 1 at the activation and polishing energy levels is lower than the pulse power of the pulse laser 1 at the melting energy level but higher than the pulse power of the pulse laser 1 at the heating and constant temperature energy levels.

As shown in FIG. 4, in the illustrated embodiment, the pulse width of the pulse laser 1 at the activation and polishing energy levels is smaller than the pulse width of the pulse laser 1 at the heating, constant temperature, melting, and cooling energy levels.

In an embodiment, in the step S10, a single pulse laser 1 is provided, and the single pulse laser 1 has multiple different energy levels. In the illustrated embodiment, the single pulse laser 1 has an activation energy level, a temperature rise energy level, a constant temperature energy level, a melting energy level, a cooling energy level, and a polishing energy level. Therefore, processing of the plating layer 120 of the workpiece 10 can be completed by the single pulse laser 1.

However, the present invention is not limited to such an embodiment. For example, in the step S10, at least two pulse lasers 1 can be provided. At least two pulse lasers 1 have energy levels that include the various energy levels. In this way, processing of the plating layer 120 of the workpiece 10 can be completed by the at least two pulse lasers 1.

Although not shown, in an exemplary embodiment of the present invention, in the step S10, a first pulse laser and a second pulse laser are provided. The first pulse laser has an activation energy level, a temperature rise energy level, and a constant temperature energy level, while the second pulse laser has a melting energy level, a cooling energy level, and a polishing energy level. In this way, it is possible to complete the processing of the plating layer 120 of the workpiece 10 through the two pulse lasers 1.

Figure 5:
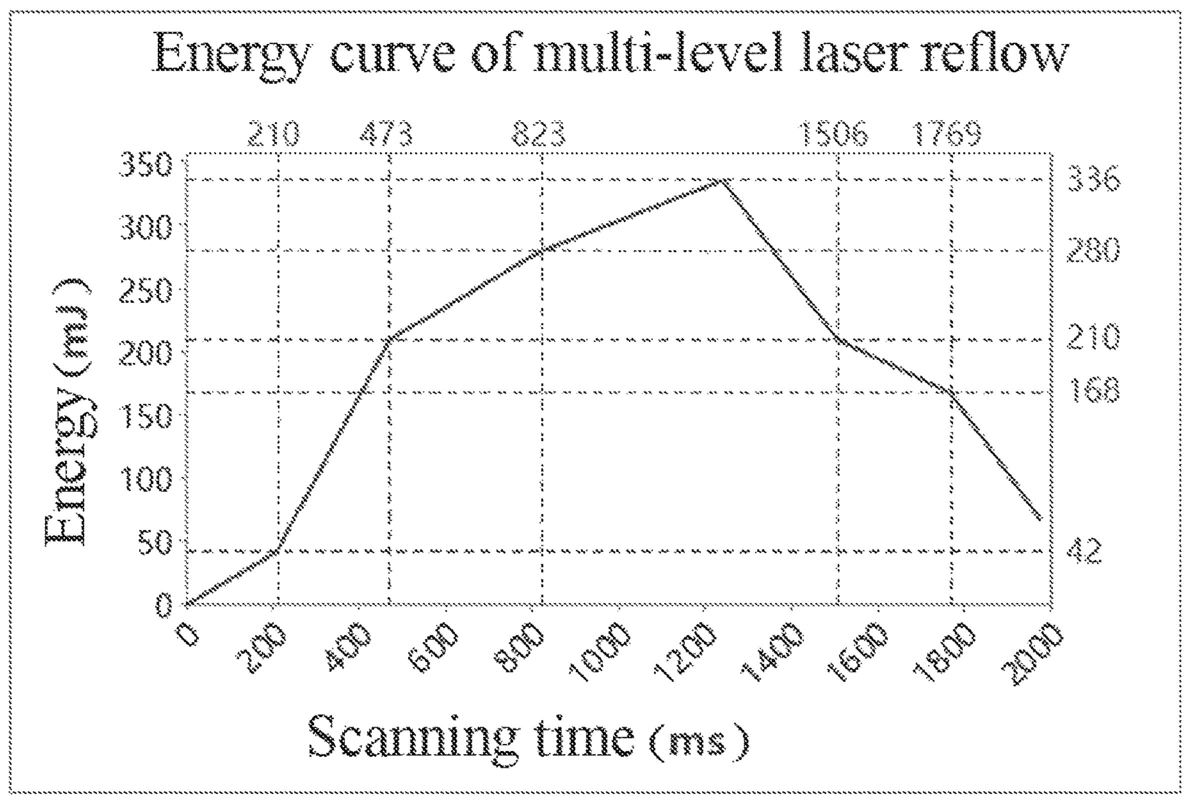
FIG. 5 shows the energy curves of a pulse laser according to an exemplary embodiment of the present invention at various energy levels shown in FIG. 4.

FIG. 5 shows the energy curves of a pulse laser 1 according to an exemplary embodiment of the present invention at various energy levels shown in FIG. 4. The energy curve shown in FIG. 5 can be plotted based on the detected energy data. The energy curve can be used to monitor and control the operation of pulse lasers 1.

Figure 6:
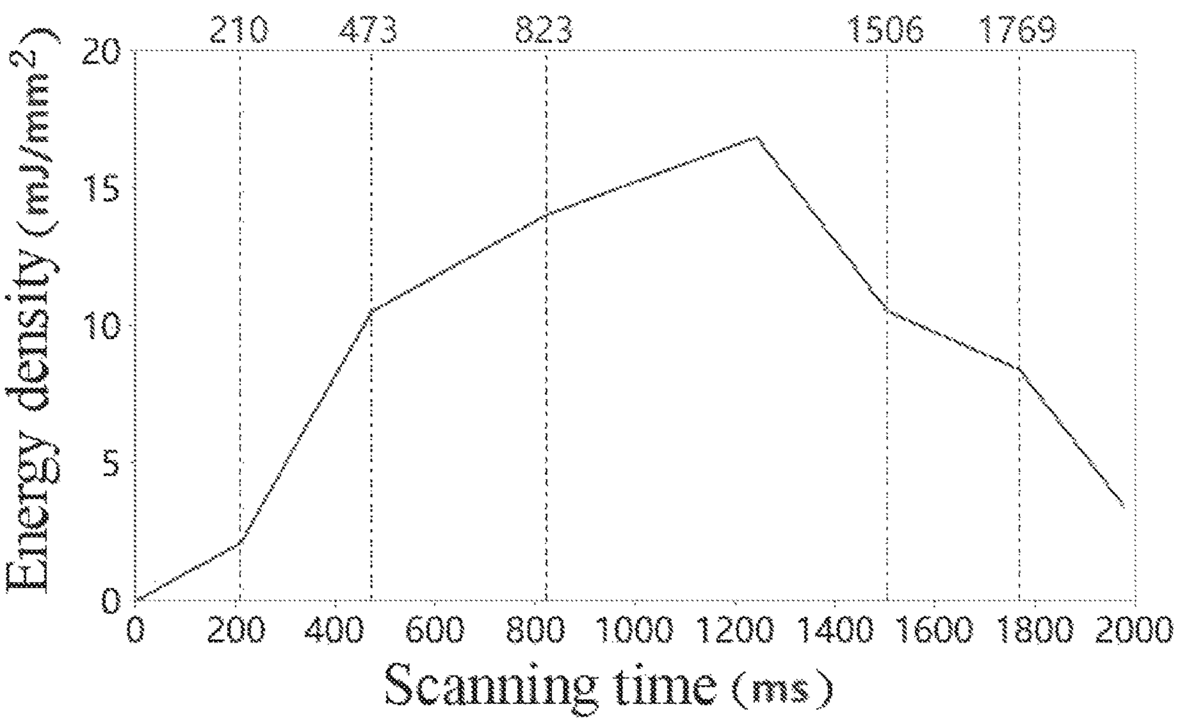
FIG. 6 shows the energy density curve of a pulse laser according to an exemplary embodiment of the present invention at various energy levels shown in FIG. 4.
Figures 7A, 7B, 7C, 7D, 7E, 7F, 7G, 7H:
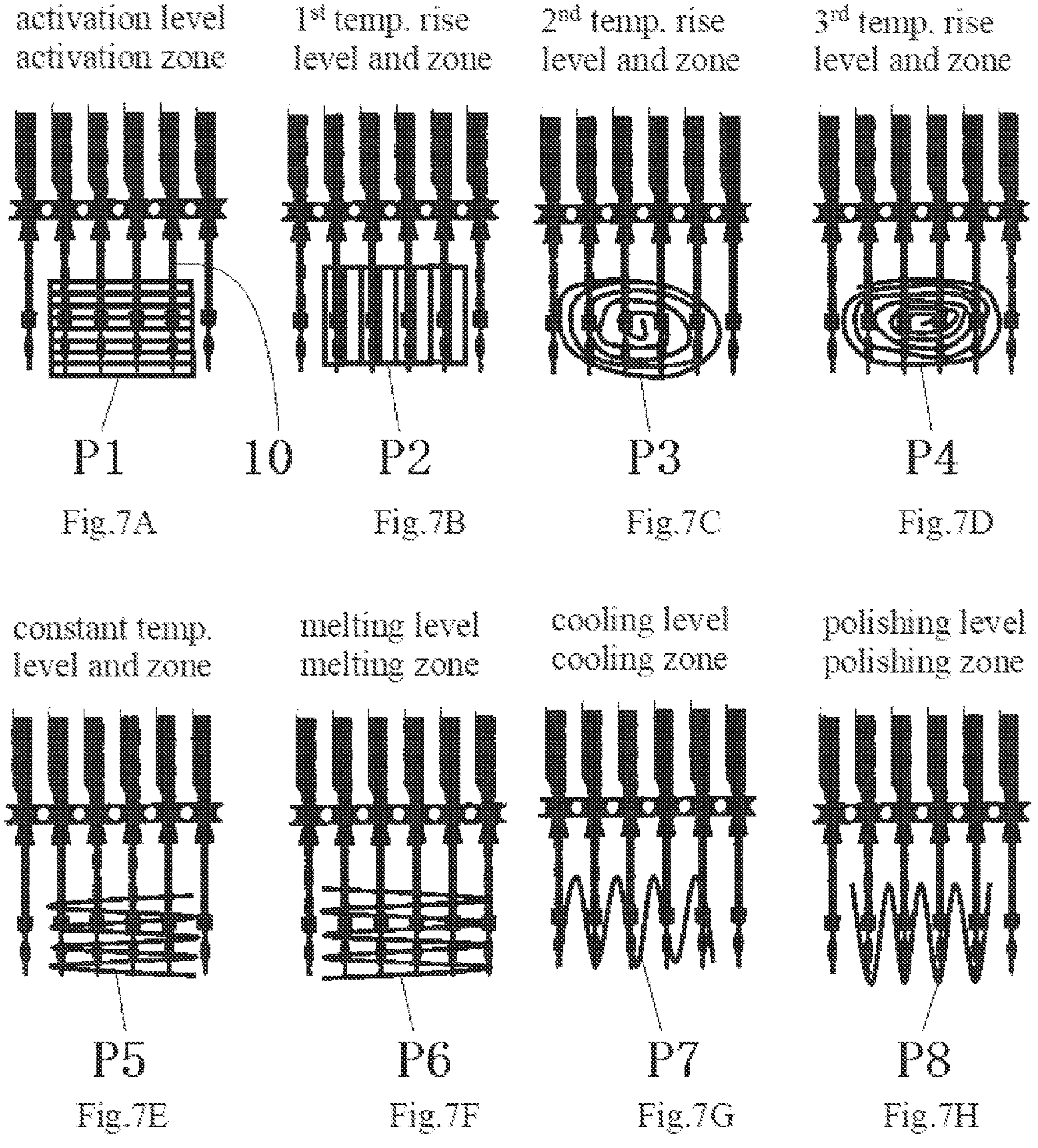
FIGS. 7A-7H show a process of treating a plating layer on a workpiece using a pulse laser according to another exemplary embodiment of the present invention.

FIG. 6 shows the energy density curves of a pulse laser according to an exemplary embodiment of the present invention at various energy levels shown in FIG. 4. The energy density curve shown in FIG. 6 can be plotted based on the detected energy data. The energy density curve can be used to monitor and control the operation of pulse lasers 1.

FIGS. 7A-7H show the process of processing the plating layer 120 on the workpiece 10 using a pulse laser 1 according to another exemplary embodiment of the present invention. As shown in FIGS. 7A-7H, in the illustrated embodiment, the pulse laser 1 has eight different energy levels. The eight different energy levels are respectively the activation energy level, the temperature rise energy level (including the first temperature rise energy level, the second temperature rise energy level, and the third temperature rise energy level), the constant temperature energy level, the melting energy level, the cooling energy level, and the polishing energy level. As shown in FIGS. 7A-7H, eight different energy levels correspond to eight different temperature zones, which are respectively referred to as the activation zone, the temperature rise zone (including the first, second, and third temperature rise zones), the constant temperature zone, the melting zone, the cooling zone, and the polishing zone.

The aforementioned step S30 may include:

S31: Adjusting the pulse laser 1 to the first temperature rise energy level, shown in FIG. 7B, and scanning the plating layer 120 on the workpiece 10 to heat the plating layer 120 to the first temperature rise zone; and S32: Adjusting the pulse laser 1 to the second temperature rise energy level, shown in FIG. 7C, and scanning the plating layer 120 on the workpiece 10 to heat the plating layer 120 to a second temperature rise zone higher than the first temperature rise zone.

The aforementioned step S30 can also include:

S33: Adjusting the pulse laser 1 to the third temperature rise energy level and scanning the plating layer 120 on the workpiece 10 to heat the plating layer 120 to a third temperature rise zone, shown in FIG. 7D, higher than the second temperature rise zone.

In an exemplary embodiment of the present invention, a workpiece manufacturing method is also disclosed, which may comprise the following steps:

S100: providing a workpiece 10 with a plating layer 120; and

S200: using the aforementioned workpiece plating treatment method to process the plating layer 120 of the workpiece 10.

In an exemplary embodiment of the present invention, step S100 includes:

S110: providing a substrate 110; and

S120: forming a plating layer 120 on the substrate 110.

In an exemplary embodiment of the present invention, the plating layer 120 on the workpiece 10 can be a tin plating layer, an indium plating layer, a bismuth plating layer, or a lead plating layer.

The present invention develops a method of multistage laser reflow melting. A quantifiable and monitored energy curve for laser reflow melting has been proposed and designed (see FIG. 5): First, the laser vaporizes or plasmas the oxides, dirt, and dust on the tin surface (illustrated here by taking the tin plating layer as an example) without generating heat or balancing at low heat, to remove the oxides, dirt, and dust on the tin surface, and increase the moisture content of the tin surface to facilitate subsequent melting and leveling. Adjusting the laser to a gradually increasing energy gradually preheats and melts the tin plating, and then adjusting the laser to a gradually decreasing energy to gradually cools the tin plating, thereby achieving a total of four main laser energy levels of preheat, preheat, constant temperature, melting, and cooling in a short time to alleviate the thermal shock of sudden cooling and heating. Finally, the laser is balanced at low heat and the surface of the molten tin is oxidized and leveled using coulomb force or plasma. These steps can be accomplished by editing a program with the same laser, including laser parameters for various levels of energy, and running the program once to quickly complete the seamless transition of multi-level energy emission tasks. Together with preprocessing and post processing, the program can be completed in one go without adding preprocessing and post processing equipment, working hours, and workstations. It can also be accomplished using multiple lasers, with each laser completing one or more levels of energy emission. Each stage of laser scanning has a different trajectory to evenly stagger, avoiding energy concentration in a single trajectory that can lead to molten pits, streaks, or ripples. The present invention can still retain the high-speed and precise advantages of laser melting, while adding fast and efficient pre-treatment activation and post treatment leveling to melting, solving problems such as shrinkage caused by oxidation and dirt of tin before melting, uneven crystallization of molten tin such as porous bulges, and high-temperature oxidation during the melting process. Importantly, it alleviates the risk of cracking and splashing of tin spots on the plating due to thermal shock caused by sudden cooling and heating, and weakening the molten pits, grooves, flow patterns, etc. caused by a single laser scanning trajectory.

The present invention can still retain the advantages of high-speed and precision laser melting, while developing six main energy levels, such as activation, preheating and heating, preheating and constant temperature, melting, cooling, and leveling, to solve problems such as shrinkage caused by oxidation and dirt of tin before melting, uneven crystallization of molten tin such as porous bulges, and high-temperature oxidation during the melting process. It is important to mitigate the risk of cracking and splashing tin spots from the thermal shock of sudden cooling and heating, as well as to weaken the molten pits, flow marks, or ripples caused by a single laser scanning trajectory. A quantifiable and monitored energy curve for laser reflow melting is proposed and designed to achieve the mass production goal of stably controlling the reflow melting process.

The functions of each energy level of the present invention are described as follows:

Activation energy level: pre-treatment to remove melting barriers. First, balance the laser beam at low heat and use coulomb force or plasma to remove oxidation, dirt, and dust on the tin surface, increasing surface moisture, which is conducive to subsequent molten tin leveling.

Temperature rise energy level, constant temperature energy level, melting energy level, and cooling energy level: achieve preheating temperature rise, preheating constant temperature, melting, and cooling in a short time.

After the activation treatment, the laser is adjusted to gradually increase energy to gradually preheat and melt the tin plating, and then the laser is adjusted to gradually decrease energy to gradually cool the tin plating, thereby achieving a total of four main laser energy levels of preheating temperature rise, preheating constant temperature, melting, and cooling in a short time, to alleviate the thermal shock of sudden cooling and heating.

3) Polishing energy level: deoxidation and flattening. Finally, the laser beam is balanced at low heat to remove oxidation and flatten the surface of molten tin using coulomb force or plasma.

The present invention has studied the reflow temperature curve of SMT for indium plating (melting point 156.6° C.) and bismuth plating (melting point 271.3° C.) on the basis of the existing reflow melting of tin plating (melting point 231.9° C.), and has expanded to multi-level laser melting based on this research. The melting time is only 1% of that of SMT hot air melting, and partial precision melting can be selected, which is suitable for the current line speed requirements of 5-15 meters per minute for selective continuous plating lines, It can achieve automatic design of electroplating and reflow melting integrated wiring.

The method of the present invention also performs well on bismuth with a higher melting point (generally, the higher the melting point, the easier it is to melt unevenly and oxidize). The present invention can make the oxidized bismuth plating melt uniformly and densely, and form stable intermetallic compounds with copper substrates and thin nickel intermediate plating layer. The hardness measured in the experiment increased by 20%, the contact electrical group changed little, and the friction coefficient decreased. These are beneficial to reducing insertion and pulling forces and mitigating whisker growth.

The following will introduce and explain in detail the meaning of each working parameter in FIG. 4 and how to select it:

Laser Wavelength—Near infrared (780-1400 nm) and fiber lasers are used in an embodiment. The same laser has the functions of low-temperature removal, heating, and high-temperature melting. Generally, the long wave is biased towards heating and melting, while the short wave is biased towards gasification and removal. If multiple lasers are considered, gasification removal can be replaced by ultraviolet light (100-380 nm) or green light (380-530 nm), and high-temperature melting can be replaced by mid infrared light (3000-5000 nm). If there are no installation space constraints, larger carbon dioxide and solid-state lasers can also be considered.

Spot Diameter—Depending on the specific product setting, the smaller the spot, the more it is removed by gasification, and the larger it is, the more it is heated. Proper defocusing can increase the spot.

Spot distance—determines the overlap or dispersion of the spot. The smaller the spot, the slower the scanning speed, the more energy is gathered, and the more uniform the melting. Adjusting it appropriately can improve production efficiency.

Scanning speed—The slower the scanning speed, the more energy is gathered, which is biased towards heating. The faster the scanning speed, the more discrete the energy, which is biased towards gasification and removal. Therefore, high speed scanning is used for slight removal of pre and post processing, and low speed scanning for heating and melting.

Pulse frequency—The number of times light is emitted per second, with higher energy accumulating, to heat and melt.

Pulse power—The intensity of light emitted, i.e., the energy of a single pulse divided by the time of a single pulse. If the material is removed, high power will increase the depth of removal. If the material is heated for melting, it will increase the temperature and speed of heating for melting. Choose higher power for metals with high melting points. The power can be calculated theoretically or measured with a power meter (FIG. 4 shows the calculation).

Pulse width—The duration of each light output. The longer the time, the more energy accumulates, heated for melting, and the smaller the pulse width to be gasified for removal.

Delay (including light output delay, light off delay, end delay, and corner delay)—Properly adjusting the delay can make the scanning energy transition natural and smooth, preventing many energy peaks from alternating and damaging the molten metal.

Scan Time—The time to complete each level of scanning, equal to the scan path divided by the scan speed+scan delay.

Cumulative Energy—The cumulative energy used to complete each level of scanning, which is the total product of the total number of pulses multiplied by the energy of a single pulse. The table in FIG. 4 is a theoretical calculation, which can be actually measured with an energy meter.

Energy Density—The distribution of the accumulated energy per unit area to complete each level of scanning, which is the total energy divided by the scanning area.

Energy curve—drawn based on theoretical calculations, which can be actually tracked using an energy meter. The actual characterization of heating and melting is temperature, but the laser speed is too fast, and complex multi-level scanning can be completed in a single local area within two seconds. Thermometers or temperature sensors are difficult to capture the areas and temperature curves of laser heating and melting. Therefore, the present invention introduces a new concept—laser heating and melting energy curve to quantitatively control the process of multistage laser reflow melting. The number of energy levels depends on the actual application.

FIG. 5 is an example of bismuth plating melting to illustrate the present invention, but it does not mean that the present invention can only use seven levels of energy and specific energy levels.

Energy density curve—drawn based on theoretical calculations, which can be actually tracked using an energy meter. The actual characterization of heating and melting is temperature, but the laser speed is too fast, and complex multi-level scanning can be completed in a single local area within two seconds. Thermometers or temperature sensors are difficult to capture the areas and temperature curves of laser heating and melting. Therefore, the present invention introduces a new concept—laser heating and melting energy density curve to quantitatively control the process of multistage laser reflow melting. The level of energy density depends on the actual application. FIG. 6 is an example of bismuth plating melting to illustrate the present invention. It does not mean that the present invention can only use seven energy levels, the scanning path shown, and the specific energy size.

Advantages of the present invention over existing reflow melting, not all of which are required to practice the present invention:

Fully uniform melting recrystallization: Pretreatment removes oxidation dirt and removes melting barriers.

Suitable for more products and applications: The post treatment compensates for the unevenness caused by the structural limitations and oxidation of the melt itself.

Energy saving and safety: Laser is used for melting, without high power heating and baking, without fire hazards.

Efficient Intelligence: The present invention can efficiently and intelligently complete tin melting by directly connecting the design drawing of the tin melting area of the workpiece with the melting laser and the robot arm through software.

Precision tin melting: The precision of the present invention can be controlled within 50 um Quantifiable and stable reflow melting process: Novel energy curves and energy density curves can be quantified and monitored to achieve the mass production goal of stably controlling the reflow melting process.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word “a” or “an” should be understood as not excluding plural of said elements or steps, unless such exclusion is explicitly stated. Furthermore, references to “one embodiment” of the present invention are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

What is claimed is:

1. A workpiece plating treatment method, comprising the steps of:

providing a pulse laser having a plurality of different energy levels, at least one of a scanning speed, a pulse frequency, a pulse power, and a pulse width of the pulse laser at the different energy levels is different;

adjusting the pulse laser to an activation energy level and scanning a plating layer on a workpiece to remove a plurality of oxides, dirt, and dust from a surface of the plating layer and activate the surface of the plating layer;

adjusting the pulse laser to a temperature rise energy level and scanning the plating layer on the workpiece to heat the plating layer to a temperature rise zone;

adjusting the pulse laser to a constant temperature energy level and scanning the plating layer on the workpiece to heat the plating layer to a constant temperature zone higher than the temperature rise zone;

adjusting the pulse laser to a melting energy level and scanning the plating layer on the workpiece to heat the plating layer to a melting zone higher than the constant temperature zone;

adjusting the pulse laser to a cooling energy level and scanning the plating layer on the workpiece to cool the plating layer to a cooling zone lower than the melting zone; and adjusting the pulse laser to a polishing energy level and scanning the plating layer on the workpiece to remove the oxides from the surface of the plating layer and to flatten the surface of the plating layer.

2. The workpiece plating treatment method according to claim 1, wherein:

a cumulative energy of a laser emitted by the pulse laser at the activation energy level and the polishing energy level is smaller than the cumulative energy of the laser emitted by the pulse laser at the temperature rise energy level, the constant temperature energy level, the melting energy level, and the cooling energy level; and an energy density of the laser emitted by the pulse laser at the activation energy level and the polishing energy level is lower than the energy density of the laser emitted by the pulse laser at the temperature rise energy level, the constant temperature energy level, the melting energy level, and the cooling energy level.

3. The workpiece plating treatment method according to claim 2, wherein the cumulative energy of the laser emitted by the pulse laser at the activation energy level is smaller than the cumulative energy of the laser emitted by the pulse laser at the polishing energy level, and the energy density of the laser emitted by the pulse laser at the activation energy level is lower than the energy density of the laser emitted by the pulse laser at the polishing energy level.

4. The workpiece plating treatment method according to claim 3, wherein the cumulative energy of the laser emitted by the pulse laser at the cooling energy level is smaller than the cumulative energy of the laser emitted by the pulse laser at the temperature rise energy level, the constant temperature energy level, and the melting energy level, and the energy density of the laser emitted by the pulse laser at the cooling energy level is lower than the energy density of the laser emitted by the pulse laser at the temperature rise energy level, the constant temperature energy level, and the melting energy level.

5. The workpiece plating treatment method according to claim 1, wherein the scanning speed of the pulse laser at the activation energy level and the polishing energy level is higher than the scanning speed of the pulse laser at the temperature rise energy level, the constant temperature energy level, the melting energy level, and the cooling energy level.

6. The workpiece plating treatment method according to claim 1, wherein the pulse frequency of the pulse laser at the activation energy level and the polishing energy level is lower than the pulse frequency of the pulse laser at the temperature rise energy level, the constant temperature energy level, the melting energy level, and the cooling energy level.

7. The workpiece plating treatment method according to claim 1, wherein the pulse power of the pulse laser at the activation energy level and the polishing energy level is lower than the pulse power of the pulse laser at the melting energy level but higher than the pulse power of the pulse laser at the temperature rise energy level and the constant temperature energy level.

8. The workpiece plating treatment method according to claim 1, wherein the pulse width of the pulse laser at the activation energy level and the polishing energy level is smaller than the pulse width of the pulse laser at the temperature rise energy level, the constant temperature energy level, the melting energy level, and the cooling energy level.

9. The workpiece plating treatment method according to claim 1, wherein in providing step, a single pulse laser is provided, and the single pulse laser has the plurality of different energy levels to be able to complete the processing of the plating layer of the workpiece through the single pulse laser.

10. The workpiece plating treatment method according to claim 9, wherein the single pulse laser has the activation energy level, the temperature rise energy level, the constant temperature energy level, the melting energy level, the cooling energy level, and the polishing energy level.

11. The workpiece plating treatment method according to claim 1, wherein in providing step, at least two pulse lasers are provided, and the at least two pulse lasers have the plurality of different energy levels to be able to process the plating layer of the workpiece through the at least two pulse lasers.

12. The workpiece plating treatment method according to claim 1, wherein in providing step, a first pulse laser and a second pulse laser are provided, the first pulse laser having the activation energy level, the temperature rise energy level, and the constant temperature energy level, and the second pulse laser having the melting energy level, the cooling energy level, and the polishing energy level.

13. The workpiece plating treatment method according to claim 1, wherein the step of adjusting the pulse laser to the temperature rise energy level includes:

adjusting the pulse laser to a first temperature rise energy level and scanning the plating layer on the workpiece to heat the plating layer to a first temperature rise zone; and adjusting the pulse laser to a second temperature rise energy level and scanning the plating layer on the workpiece to heat the plating layer to a second temperature rise zone higher than the first temperature rise zone.

14. The workpiece plating treatment method according to claim 13, wherein the step of adjusting the pulse laser to the temperature rise energy level includes adjusting the pulse laser to a third temperature rise energy level and scanning the plating layer on the workpiece to heat the plating layer to a third temperature rise zone higher than the second temperature rise zone.

15. The workpiece plating treatment method according to claim 1, wherein the step of adjusting the pulse laser to the cooling energy level includes:

adjusting the pulse laser to a first cooling energy level and scanning the plating layer on the workpiece to cool the plating layer to a first cooling zone lower than the melting zone; and adjusting the pulse laser to a second cooling energy level and scanning the plating layer on the workpiece to cool the plating layer to a second cooling zone lower than the first cooling zone.

16. The workpiece plating treatment method according to claim 15, wherein the step of adjusting the pulse laser to the cooling energy level includes adjusting the pulse laser to a third cooling energy level and scanning the plating layer on the workpiece to cool the plating layer to a third cooling zone lower than the second cooling zone.

17. The workpiece plating treatment method according to claim 1, wherein a plurality of scanning trajectories of the pulse laser at the different energy levels are different, and the scanning trajectories of the pulse laser at different energy levels only have intersection points but no overlap segments, so that the distribution of the scanning trajectories is more uniform.

18. A workpiece manufacturing method, comprising steps of:

providing a workpiece having a plating layer; and processing the plating layer of the workpiece using the workpiece plating treatment method according to claim 1.

19. The workpiece manufacturing method according to claim 18, wherein the step of providing the workpiece includes providing a substrate and forming the plating layer on the substrate.

20. The workpiece manufacturing method according to claim 19, wherein the plating layer is a tin plating layer, an indium plating layer, a bismuth plating layer, or a lead plating layer.

* * * * *